Figure 3:
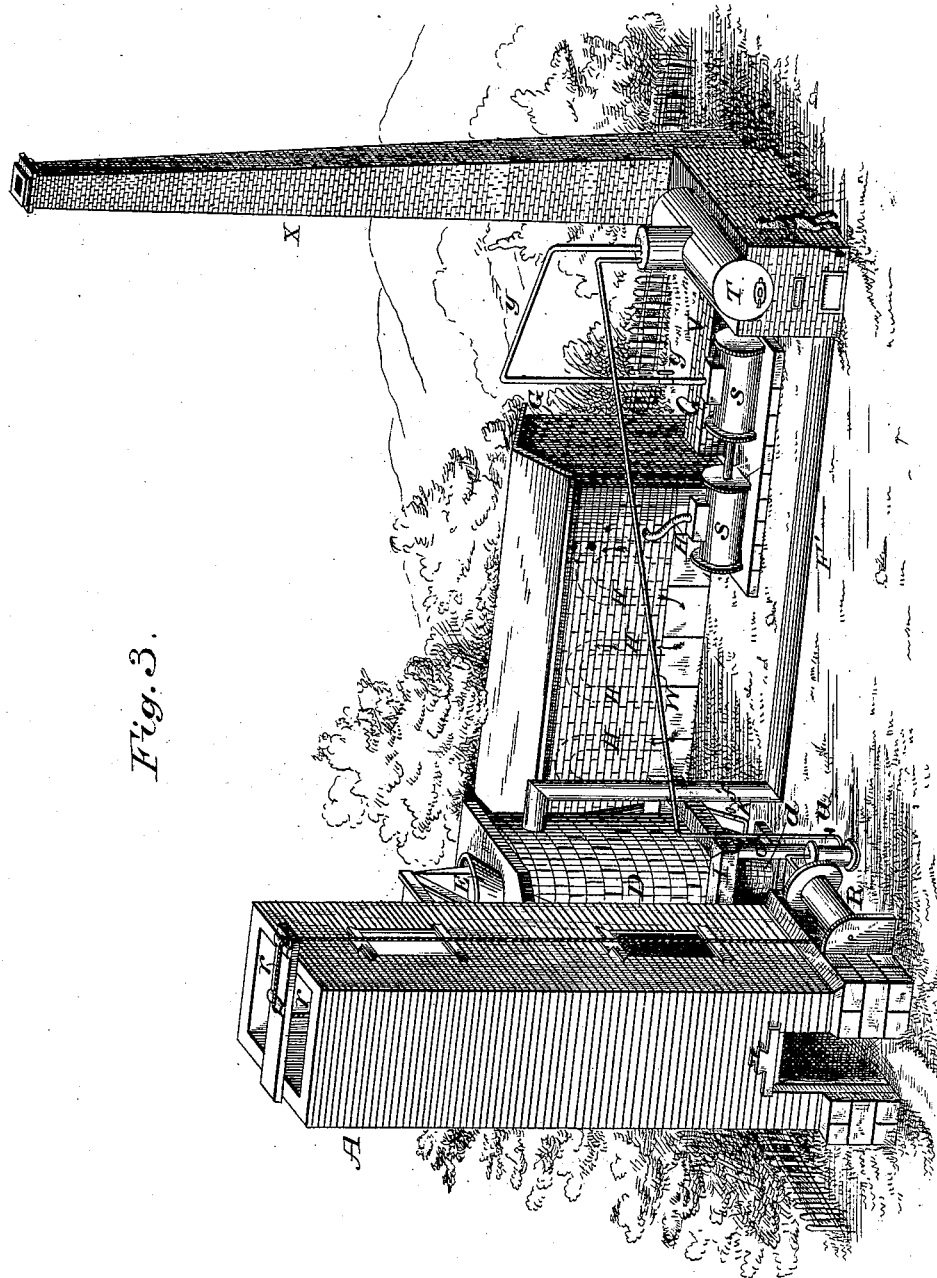

2 Sheets—Sheet 1.
H. R. FOOTE.
Furnace for Cremating Garbage.
No. 211,503.      Patented Jan. 21, 1879.
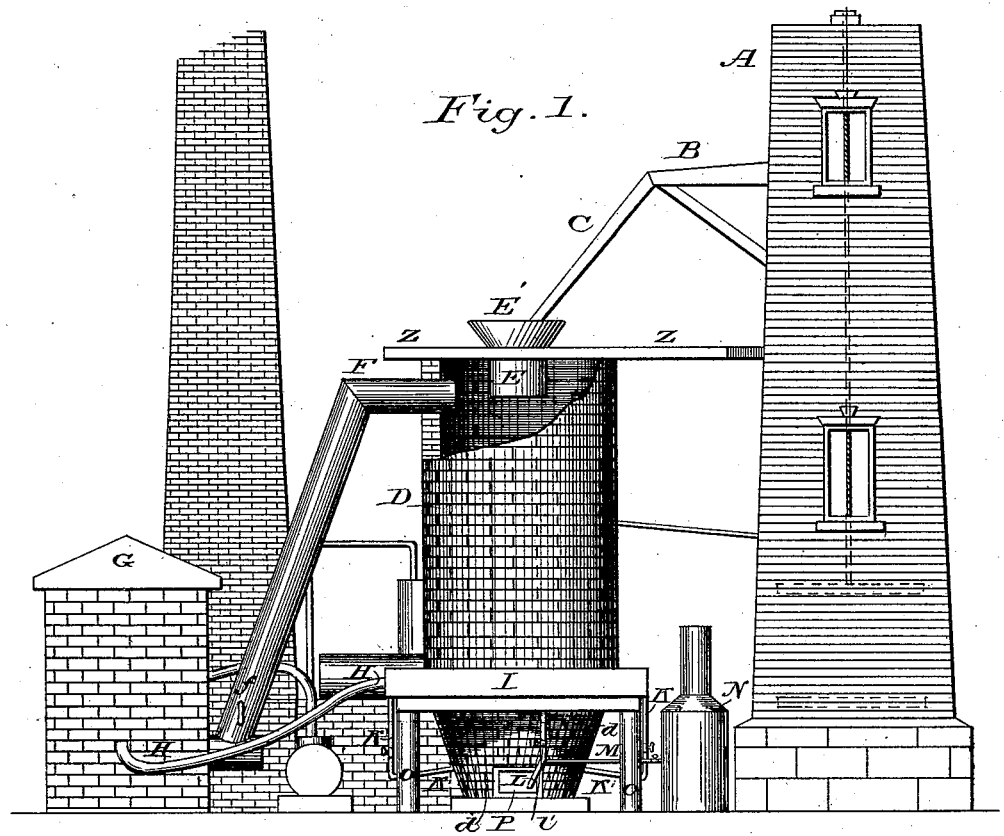
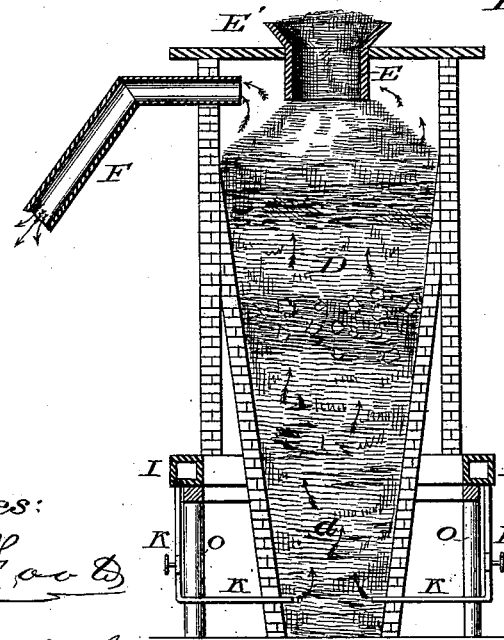
Witnesses:
Geo. F. Foote
M. B. Macfarlane
Inventor:
Henry R. Foote 2 Sheets—Sheet 2.

H. R. FOOTE.
Furnace for Cremating Garbage.

No. 211,503. Patented Jan. 21, 1879.

Witnesses
Gro. F. Foote
M B Macfarlane

Inventor:
Henry R. Foote

UNITED STATES PATENT OFFICE.

HENRY R. FOOTE, OF STAMFORD, CONNECTICUT.

IMPROVEMENT IN FURNACES FOR CREMATING GARBAGE.

Specification forming part of Letters Patent No. 211,503, dated January 21, 1879; application filed September 25, 1878.

*To all whom it may concern:*

Be it known that I, HENRY R. FOOTE, of Stamford, Fairfield county, Connecticut, have invented certain Improvements in Furnaces for Cremating Garbage, of which the following is a specification:

The object of my invention is to cremate or consume by fire, without (or with) the employment of other fuel, all of the garbage, street-sweepings, coal-ashes, house, store, and tenement offal and refuse, the condemned animal and vegetable matter of the markets and other sources, all of the refuse matter of large cities, towns, and villages, the removal and deposition of which is so expensive, and the decomposition by the process of eremacausis (slow decay) is so productive of foul and offensive odors and disease.

The refuse matter and garbage of large cities is in the main composed of animal and vegetable offal of the kitchens; of the sweepings of warehouses, manufactories, saloons, groceries, public and private houses, composed of straw, sawdust, old bedding, tobacco-stems, ashes, old boots, shoes, tin cans, bottles, rags, and feathers; dead cats, dogs, rats, mice, and other small animals; of the dust and sweepings of the streets, the condemned fruit, vegetables, meat, and fish of the markets, all of which compose a mass of the most obnoxious and unhealthy matter that can be deposited near human habitations.

To consume and destroy, to produce a change of form and of chemical nature and a great reduction in bulk of all such refuse and garbage within the limits of the city where it accumulates when desired without any screening, separating, preparing, or mixing, without the expense of using other fuel, without any offensive odors being generated in the operation, and to produce an entirely unobjectionable residuum or product, and one that may be made useful for other purposes, is the object of my invention.

At most seasons of the year the organic matter of the refuse largely preponderates, being as high in some instances as ninety-four per centum. At other seasons it is less; but at all seasons there is more than enough to generate sufficient heat under proper circumstances to fuse or melt the earthy or inorganic portion, which is mainly composed of sand, (silex,) clay, (alumina,) and the alkalies, (sodium, potash, &c.,) from the coal and vegetable ashes, &c.

By producing a high degree of heat in the combustion of the organic or combustible portion of the refuse with a forced blast or forced draft, the non-combustible or inorganic elements above shown are fused or melted, and form a vitreous slag or glass, which is entirely inodorous and unobjectionable, and which may be utilized for many purposes.

That others skilled in the art may understand and use my invention, I submit the following specifications:

Figure 1 is a front elevation of my apparatus, Fig. 2 being a vertical section of the furnace D. Fig. 3 is a perspective elevation of the back of the furnace and its appliances.

The same letters represent the same parts in the several figures.

D is the consuming-furnace, the upper section or cone of which may be built of boiler-iron, cylindrical in form, and lined with fire-brick resting upon an iron plate, which plate is imposed upon and supported by the iron columns O O.

The lower section or hearth, $d$, may be made of fire-brick or refractory fire-stone. It is in the form of an inverted cone, being smaller at the bottom and larger at the top, which terminates within the walls of the cone, as seen in Fig. 2.

The sides of the hearth $d$ are perforated near the bottom with arches for the tuyeres or blast-pipes K K K, and also in front for the special blast pipe L and the tapping-hole P.

In construction care must be used that the walls of the furnace are well built, strong, and the joints air and gas tight.

The top of the furnace is closed with the iron plate Z, provided with a circular opening, through which the cone E of the hopper E' enters the top of the furnace and extends downward three or four feet.

The hopper and cone may be made of strong boiler-iron, and should be fitted closely to the opening of the top plate Z, so as to prevent the escape of any gas or air through or around the sides.

A is an elevator, operated by a steam-engine or other machinery for conveying the garbage and refuse to the platform B, from whence it is projected into the furnace by the inclined plane or chute C.

The elevator and hoisting-platform may be made sufficiently large to hold both the horse and cart bringing the refuse and convey them to the platform B, from which the load may be dumped from the cart direct over the incline C into the hopper E, thus saving all handling. The movable platform of the elevator is raised and lowered by the hoisting-engine R, the wire cable $r\ r$, or by other suitable mechanism.

Instead of the elevator the platform B may be reached by an incline where the ground will admit of it, or the garbage may be conveyed in baskets, buckets, or cars, or any other suitable means.

F and F' are gas or smoke conductors, provided with stop-gates $f\ f'$, which, leaving the furnace just below the top plate Z, convey the gas from the top of the furnace D to the furnace of the boiler T by the conductor F', and to the heating-oven G by the conductor F, where it is consumed in heating the air-pipes H H H H. S is an air-pump or blowing-engine, from which the air is conveyed through the iron pipes H H H H, passing through the heating-oven G into the wind-box I, from which it enters the furnace D at several points near the bottom by means of the tuyere-pipes K K K.

The iron pipe H H H H in passing through the oven G is formed of returns or coils, so as to expose the greatest amount of heating-surface to the fire. The cold air in passing through the hot pipes is heated to as high a temperature as practicable to obtain.

$y$ is a steam-pipe, provided with a stop-valve to convey steam from the boiler to the blowing-engine S S. $u$ is also a steam-pipe, provided with a stop-valve to convey steam from the boiler T to the hoisting-engine R. T is a steam-boiler, the furnace of which is connected with the high smoke-stack X, which should be at least three (3) times as high as the furnace D, or high enough to insure a strong draft.

G is the heating-oven, built of brick, having furnace grate-bars and a flue, V, which conveys the smoke and products of combustion to the chimney X. In this oven the return strands or coils of the air-pipe H H H H are placed, which are exposed to a very strong heat, for the purpose of heating the air for the consuming-furnace as hot as practicable.

I is a wind-box or "bustle-pipe" passing partially or entirely around the consuming-furnace D, receiving the air from the pipe H and distributing it by means of the tuyere-pipes K K K, provided with stop-gates, so that any one can be closed at will. They enter the furnace through the walls of the arches, are fitted tight with balls of clay, and are prevented from melting by a water-jacket. (Not shown.)

L is a special blast-pipe, provided with a stop-valve, $l$, which conveys the blast so as to have it enter the furnace through the tapping-hole P. N is a small boiler, to hold naphtha or crude or refined petroleum, or any of the light hydrocarbon oils, the small pipe M, provided with valves, conveying vapors or gases generated from such hydrocarbons to the special blast-pipe L.

Fig. 2 is a vertical section of the furnace D, showing plan of cone E and hearth $d$, wind-pipe I, tuyeres K K K, the furnace full of garbage, the vacant space or gas-chamber above the bottom of the cone E and between the top of the garbage and the bottom of the plate Z, and showing also the course of the odoriferous gases, smoke, and products of combustion, which, being unable to escape through the cone E, (the hopper being full continually,) are drawn by the strong draft of the chimney X through the conductors F F', to be conveyed through the fires of the hot oven and boiler-furnace, before described.

The mode of starting and operating the furnace is as follows: The furnace having been thoroughly dried and warmed, a fire with wood and shavings or other fuel is started upon the hearth, the tapping-hole being left open for draft, and as soon as said fire is well under way the furnace may be filled with coke, charcoal, or other fuel about as high as the wind-box. Fires should now be started under the boilers and in the heating-oven. When the coke or coal in the furnace is well ignited, filling in with garbage may commence and the blowing-engine started, but worked very slowly, and so continued until the furnace is full at the top of the hopper E, when the tapping-hole may be closed, and the full blast put on.

The consumption of the garbage is effected near the bottom of the furnace, where the air for the combustion enters, (or is forced in,) and is continued as long as the blast is applied, and, while burning at the base, it is continually sinking down at the top, so that it is necessary to keep filling all the time. The odoriferous gases and the hot products of such combustion are forced upward through the superimposed mass, and not being able to escape into the open air through the cone E, it being kept full of fresh material, they escape by the easier passages F F' to the fires of the boiler and heating-oven, and, being largely composed of carbonic oxide and the hydrocarbon gases distilled from the animal and vegetable offal of the garbage, are thoroughly consumed; and by this means not only are all offensive odors destroyed, but the heat generated is utilized for making steam and heating the air used for blast.

The refuse in its descent through the high furnace is exposed to the drying action of the hot gases of distillation and the hot products of combustion, (its temperature increasing in its descent the nearer it approaches the tuyeres,) and becomes completely desiccated and combustible when it reaches the blast. The high heat in this way obtained by the combustion of the organic portion fuses or melts all of the inorganic portion, forming a vitreous slag or glass, which may be allowed to run continuously, or by closing the tap may be allowed to accumulate, and can be drawn off at intervals. If there is an adequate supply of clay and sand in the refuse, to combine with the ashes, the slag will run hot and free. The combination of silex (sand) or alumina (clay) and an alkali in proper portions always yields a fusible easy-running compound; but if the slag is too stiff and chills in the tapping-hole or on the bottom of the hearth the difficulty is removed as follows:

The small boiler N being partially filled with oil or naphtha, gas and vapor are generated (by fire under the boiler) and by the pipe M conveyed to the special blast-pipe L, and blown onto the hot slag, mixed with oxygen for combustion, and generate a very powerful heat, that will keep the tapping-hole clean and the slag running as long as it is applied, thus preventing any delay of work by the "bunging up" of the tapping-hole or the hearth.

If there is a deficiency of clay and sand, and only ashes in the refuse, the residuum, instead of being a vitreous slag, will be a clinker, difficult to withdraw from the furnace. In such cases sand and clay or loam may be added, or a desirable slag may be obtained by the use of a flux. For this purpose may be used salt-cake (the refuse of muriatic-acid works) or common salt or sea water. When sea-water is used the ashes are wetted before they go into the furnace. The salts are thrown in with the garbage in proportions of from two and one-half to five per cent., by weight.

The furnace can be operated and the cremation performed without heating the blast; but it requires much more labor to keep the slag running, and more frequent application of the oil-blast.

The molten slag, as it runs from the furnace, may be discharged into tanks of cold water, which will pulverize or granulate it, making it like fine sand, or as it pours over a runner, through which it flows, if struck with a forcible air or steam blast it will be spun into fine thread-like wool.

If the blast is stopped at any time, so that the flow of gas is interrupted, a fire must be lighted with wood or coal, in the furnace of the heating-oven and boiler, before the engine is started again; otherwise an explosion of gas will take place when it is again ignited, which may prove destructive.

The furnace once lighted and started may be kept running day and night continuously for days, months, or years, if desired; but if it becomes necessary to stop at any time, the tuyere-pipes may be removed and the holes all stopped with clay, so as to entirely shut off the supply of air, and it will then hold in fire for many days, and will be in readiness to start again at any time the pipes are replaced and the blast turned on.

If the chimney X is built high enough, or a forced draft obtained by means of a steam-jet or forced air, by leaving the tapping-hole open a combustion of the garbage can be maintained without the aid of a blowing-engine or a forced blast; but the cremation is too slow to consume large accumulations rapidly.

I am aware that unburned and offensive gases have been conducted from furnaces by means of flues and utilized elsewhere, and that such gases from the top of a garbage-furnace have been returned to its base to be burned, and that slag has been granulated and spun, and also that the several independent parts of my apparatus are not new; and these things I do not claim, broadly; but What I do claim, and desire to secure by Letters Patent, is—

1. The method of disposing of garbage, ashes, and street refuse without screening or special mixing, consisting in partially drying and burning the same in a close furnace, removing the unconsumed and offensive gases to separate furnaces to be burned, and converting the non-combustible residuum into a fluid by means of a flux, substantially as set forth.

2. The improvement in the method of burning garbage, ashes, and street refuse, consisting in adding to said material salt-cake, or its equivalent, to facilitate the removal of the unconsumed portion or residuum in a fluid state adapted to be granulated or spun, as set forth.

3. As an improvement in the method of burning garbage, ashes, and street refuse, wherein the offensive gases produced by the partial burning of the material at the base of the furnace are conducted to a separate furnace or furnaces to be burned and rendered inoffensive, the production of a slag, as set forth, and its liquefaction by means of the vapor-producing apparatus and blast, substantially as described.

4. The combination of the furnace D with the elevator A, its platforms B, hoisting-machine R, with the inclined chute C, hopper and cone E' E, gas-conductors F F', heating-oven G, air-pipes H, H, H, and I, tuyere-pipes K, K, K, and L, with the stop-valves, the oil or naptha boiler N, with the vapor-pipe M and its valves, steam boiler and furnace T, the high chimney X, steam-pipes $u$ and $y$, and blower S, all as and for the purposes set forth.

HENRY R. FOOTE.

Witnesses:
GEO. F. FOOTE,
M. B. MACFARLANE.